United States Patent
Fukazawa et al.

(10) Patent No.: US 8,545,642 B2
(45) Date of Patent: Oct. 1, 2013

(54) IRON AND STEEL MATERIAL HAVING QUENCHED SURFACE LAYER PART, METHOD FOR PRODUCING THE IRON AND STEEL MATERIAL, AND QUENCHED COMPONENT

(75) Inventors: Kengo Fukazawa, Hiratsuka (JP); Yoshitaka Misaka, Hiratsuka (JP); Kazuhiro Kawasaki, Hiratsuka (JP); Yoshihiro Ikeda, Chuo-ku (JP); Masaaki Beppu, Chuo-ku (JP); Arata Suda, Chuo-ku (JP)

(73) Assignees: Neturen Co., Ltd., Tokyo (JP); Nihon Parkerizing Co., Ltd., Tokyo (JP)

( * ) Notice: Subject to any disclaimer, the term of this patent is extended or adjusted under 35 U.S.C. 154(b) by 227 days.

(21) Appl. No.: 12/993,468

(22) PCT Filed: May 19, 2009

(86) PCT No.: PCT/JP2009/059194
§ 371 (c)(1),
(2), (4) Date: Apr. 12, 2011

(87) PCT Pub. No.: WO2009/142205
PCT Pub. Date: Nov. 26, 2009

(65) Prior Publication Data
US 2011/0186186 A1      Aug. 4, 2011

(30) Foreign Application Priority Data
May 19, 2008   (JP) ................. 2008-131403

(51) Int. Cl.
*C23C 8/58*   (2006.01)
*C23C 8/80*   (2006.01)
*C21D 1/10*   (2006.01)

(52) U.S. Cl.
USPC ............ 148/217; 148/224; 148/277; 148/526

(58) Field of Classification Search
None
See application file for complete search history.

(56) References Cited

U.S. PATENT DOCUMENTS 4,024,617 A * 5/1977 McCormick ................. 148/526
4,168,190 A * 9/1979 Eguchi et al. ................ 148/568

(Continued)

FOREIGN PATENT DOCUMENTS

| JP | 1983-096815 A | 6/1983 |
| JP | 2008-038220 A | 2/2008 |

OTHER PUBLICATIONS

International Search Report (ISR) issued in PCT/JP2009/059194 (international application) mailed in Jun. 2009.

(Continued)

*Primary Examiner* — George Wyszomierski
(74) *Attorney, Agent, or Firm* — Chen Yoshimura LLP (57) ABSTRACT

Providing an iron and steel material having quenched surface part, avoiding oxidation of a compound layer formed on the surface of the iron and steel material due to quenching, its production method, and an induction-quenched component. A quenched iron and steel material 10 comprises an iron and steel material 11, a compound layer 12 formed on the iron and steel material 11, and an antioxidant cover layer 13 formed on the compound layer 12. The iron and steel material 11 has a hardened layer having a given depth, and the surface of the iron and steel material 11 has enhanced hardness. A method for producing the iron and steel material 10 comprises a first step for forming the antioxidant cover layer 13 to cover the compound layer 12 formed on the iron and steel material 11, and a second step for applying induction hardening to the iron and steel material 11 having the compound layer 12 and the antioxidant cover layer 13, with the temperature increased in a given heating time until the given heating temperature is reached, and with cooling immediately performed once the heating temperature is reached.

2 Claims, 6 Drawing Sheets

(56) References Cited

U.S. PATENT DOCUMENTS

| | | | |
|---|---|---|---|
| 6,982,120 B2* | 1/2006 | Schuster | 428/472 |
| 2003/0201036 A1* | 10/2003 | Hashimura et al. | 148/333 |
| 2004/0226632 A1* | 11/2004 | Lecoester | 148/574 |
| 2010/0163138 A1 | 7/2010 | Beppu et al. | |

OTHER PUBLICATIONS

Written Opinion (PCT/ISA/237) issued in PCT/JP2009/059194 (international application) mailed in Jun. 2009.

* cited by examiner

IRON AND STEEL MATERIAL HAVING QUENCHED SURFACE LAYER PART, METHOD FOR PRODUCING THE IRON AND STEEL MATERIAL, AND QUENCHED COMPONENT

TECHNICAL FIELD

The present invention relates to an iron and steel material having quenched surface layer part to be used as a mechanical structural component having excellent mechanical strength such as high surface durability, high abrasion resistance, and bending fatigue strength.

BACKGROUND ART

To achieve higher mechanical strength, mechanical structural components made of cast iron, steel, etc. conventionally undergo surface hardening treatment such as nitriding, nitrocarburizing, carburizing and quenching, and induction hardening. A nitride layer formed on the outermost surface by nitriding, of these treatment methods, a compound layer on the surface side, in particular, is known to have excellent sliding resistance and also have high fatigue strength.

A hardened layer formed by conventional nitriding or nitrocarburizing treatment is thinner than the one formed by carburizing and quenching or induction hardening, and consequently, there is room for improvement regarding surface durability, fatigue strength, etc.

In view of the above situation, a composite hardening treatment, in which induction hardening is performed after nitriding or nitrocarburizing treatment, has recently been developed to obtain a thicker hardened layer, thus increasing surface durability and fatigue strength.

With this composite treatment method, if induction hardening is performed after a compound layer such as a nitride film is formed on the surface of an iron and steel material by nitriding treatment, for example, nitrogen contained in the compound layer diffuses over the surface layer part of the iron and steel material, thus increasing a so-called N diffusion layer.

Induction hardening of the above case requires quenching temperature the same as or higher than the Ac1 transformation temperature, at which the material transforms into an austenite structure, and temperature is normally selected from the 750° C. to 1050° C. range. For example, iron and nitrogen are bonded in a nitride layer formed at the nitriding temperature of 570° C. If the nitride layer is reheated up to 650° C. or higher, the layer is decomposed due to oxidation, and the nitrogen in the nitride layer is discharged as nitrogen gas from the outermost surface, whereas the nitrogen is diffused within the layer.

As a result, the surface layer part of the compound layer is oxidized by induction hardening, and the surface of the compound layer turns into an oxidized layer. Since the oxidized layer is porous, whereas the compound layer is dense, the surface of the compound layer is not exposed, being covered with the oxidized layer, or the compound layer may become thinner because at least a part of the layer may be lost. Consequently, mechanical strength, sliding resistance or abrasion resistance inherent in the compound layer may be lost.

Meanwhile, to solve the above problem, namely a nitride layer formed on the surface by nitriding treatment may be damaged or lost due to high-temperature heating if it is subjected to induction hardening as it is, Patent Literature 1 discloses a method in which silicon oxide-based gas nitriding/ion nitriding inhibitor, carburizing inhibitor, anti-oxidant, etc. are applied over the surface having undergone nitriding treatment in thickness of 1 to 3 mm.

In addition, Patent Literature 2 discloses a quenched iron and steel material characterized in that a compound hard nitride layer is formed on the surface of an iron and steel material, and an inorganic compound layer containing at least a type of metal oxide selected from the group of Ti, Zr, Hf, V, Nb, Ta, Cr, W, Mo, and Al is formed as an upper layer of the compound hard nitride layer.

CITATION LIST

Patent Literature

Patent Literature 1: JP1983-096815A
Patent Literature 2: JP2008-038220A

SUMMARY OF INVENTION

Technical Problem

The quenching method disclosed by Patent Literature 1 can prevent oxidation phenomenon due to heating, but film thickness of 1 mm or thicker is required. In addition, since low thermal conductivity decreases cooling rate, cooling temperature at the time of quenching becomes insufficient. Consequently desired hardness cannot be obtained. In addition, since such an antioxidant film has high frictional resistance, the film must be removed after quenching, which impairs production efficiency.

Patent Literature 2 argues that a compound layer, which is made of hard nitride, formed on the surface of the iron and steel material is protected from damage and loss during quenching process by the surface protective agent of the inorganic compound layer formed prior to the quenching process. However, if quenching was performed at high temperature exceeding 800° C. for 3 seconds or longer, oxidation of the compound layer was not prevented in some cases even if the present invention was applied.

In view of the above circumstances, the present invention intends to provide an iron and steel material having a quenched surface layer part, the quenching being performed while oxidation due to induction hardening of a compound layer formed on the surface of the iron and steel material is prevented, a method for producing the iron and steel material, and a quenched component.

Solution to Problem

The present inventor et al have earnestly continued studies, found that the oxidation of a compound layer formed on the surface of an iron and steel material can be prevented by performing induction heat treatment in a short period of time, and thus completed the present invention.

To achieve the above objective, an iron and steel material having quenched surface layer part according to the present invention comprises a base material, a compound layer formed on the surface of the base material, and an antioxidant cover layer formed on the compound layer, characterized in that the iron and steel material has a quench-hardened layer having a given depth from the surface of the base material, and that a porous oxidized layer is not formed on the surface layer part of the compound layer.

In the above structure, the compound layer is preferably a nitride layer containing at least one element selected from Fe, Ti, Zr, Mo, W, Cr, B and Si, whereas the antioxidant cover layer is preferably an oxide of metal element. The oxide contains at least one element selected from the group of Ti, Zr, Hf, V, Nb, Ta, Cr, W, Mo and Al.

The quenched component of the present invention, a power train component, for example, is characterized in that the above iron and steel material is used.

To achieve the above objective, the induction hardening method for an iron and steel material of the present invention comprises a first treatment process for forming an antioxidant cover layer to cover a compound layer formed on a surface of a base material, and a second treatment process for applying induction hardening to an iron and steel material comprised of a compound layer and an antioxidant cover layer formed on the base material, characterized in that in the second treatment process, heating is performed until a given heating temperature (T1) is reached in a given heating time (t1), and that cooling is performed immediately once the given heating temperature is reached.

In the above method, the heating temperature T1 preferably falls within the 760° C.≤T1≤880° C. range, and the heating time t1 falls within the 0.6 sec.≤t1≤2 sec. range. Preferably, the antioxidant cover layer in the first treatment process is formed so that the antioxidant cover layer is attached to it in the amount 150 to 200 mg/m$^2$.

According to the above method, since induction hardening is applied to the surface layer part of the iron and steel material after the antioxidant cover layer, preferably a titanium oxide layer, is formed on the compound layer on the surface of the base material, oxidation of the compound layer is prevented by the antioxidant cover layer.

Consequently, since transmutation of the surface layer part of the compound layer into a porous oxidized layer is suppressed, the compound layer remains thick, and hardness is enhanced via induction hardening. Mechanical strength, sliding resistance, abrasion resistance, etc. inherent in the compound layer can thus be maintained.

Advantageous Effect of Invention

In the iron and steel material having quenched surface layer part according to the present invention, formation of an oxidized layer due to induction hardening on the surface of a compound layer is suppressed. Consequently, the possibility that the remaining compound layer becomes thin, or a part of the compound layer is lost, is eliminated. A relatively thick compound layer can remain as a result, and thus mechanical strength sliding resistance, and abrasion resistance are never impaired.

DESCRIPTION OF EMBODIMENTS

Some embodiments of the present invention will hereinafter be described in detail by referring to the drawings.

Figure 1:
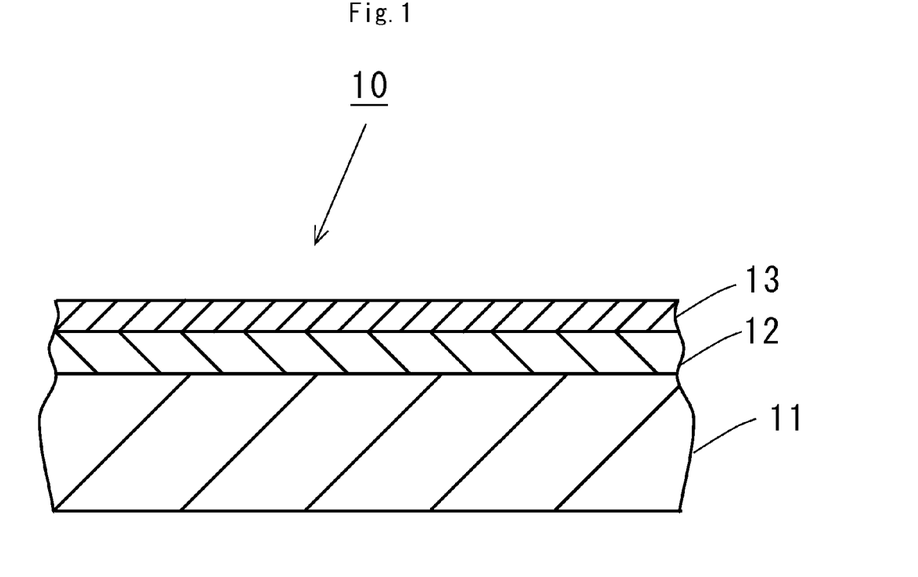
FIG. 1 is a schematic diagram of the cross-sectional area of an iron and steel material having quenched surface layer part showing the state before the induction heating is performed according to the first embodiment of the present invention.

FIG. 1 is a schematic diagram of the cross-sectional area of an iron and steel material 10 having quenched surface layer part showing the state before induction hardening is performed according to the first embodiment of the present invention.

Before applying quenching is performed, the iron and steel material 10 shown in FIG. 1 comprises an iron and steel material 11 (hereinafter referred to as the base material), a compound layer 12 formed on the surface of the base material 11, and an antioxidant cover layer 13 formed on the compound layer 12.

The name of the present invention "iron and steel material" is referred to as the iron and steel material having a compound layer 12 and an antioxidant cover layer 13 on its surface, and the "base material" is referred to as an iron and steel material not having a compound layer 12 or an antioxidant cover layer 13 on it.

The base material 11 is an iron and steel material such as carbon steel, low-alloy steel, high-alloy steel, and cast iron, for example, and high-carbon steel, low-alloy steel, etc. are used preferably.

The compound layer 12 is formed by applying surface treatment to the base material 11. The compound layer 12 is preferably a nitride layer containing at least one element selected from Fe, Ti, Zr, Mo, W, Cr, B and Si, for example.

Surface treatment methods for forming the compound layer 12 are unlimited, and for example, nitride diffusion, chemical vapor deposition (CVD), physical vapor deposition (PVD) methods, etc. are used to form the layer. Salt-bath nitrocarburizing such as ISONITE™ treatment and PALSONITE treatment, gas nitrocarburizing, ion nitridation, plasma nitridation, etc. are more preferable.

The antioxidant cover layer 13 is an oxide layer of metal element. The oxide layer contains at least one element selected from the group of Ti, Zr, Hf, V, Nb, Ta, Cr, W, Mo, and Al. Ti oxide ($TiO_2$), in particular, is preferable, and by immersing an object to be treated in a solution containing Ti compound, for example, pulling it out of the solution, and using a coating method such as dip coating followed by a drying process, the antioxidant cover layer can be formed on the compound layer 12.

The antioxidant cover layer 13 is formed with the amount of metal attachment maintained at 150 to 200 mg/m$^2$ level to prevent oxidation of the compound layer 12 below the antioxidant cover layer 13 due to induction heating without fail.

The iron and steel material 10 in the embodiment of the present invention is configured as described above before induction hardening is performed. Its production method will hereinafter be described.

Figure 2:
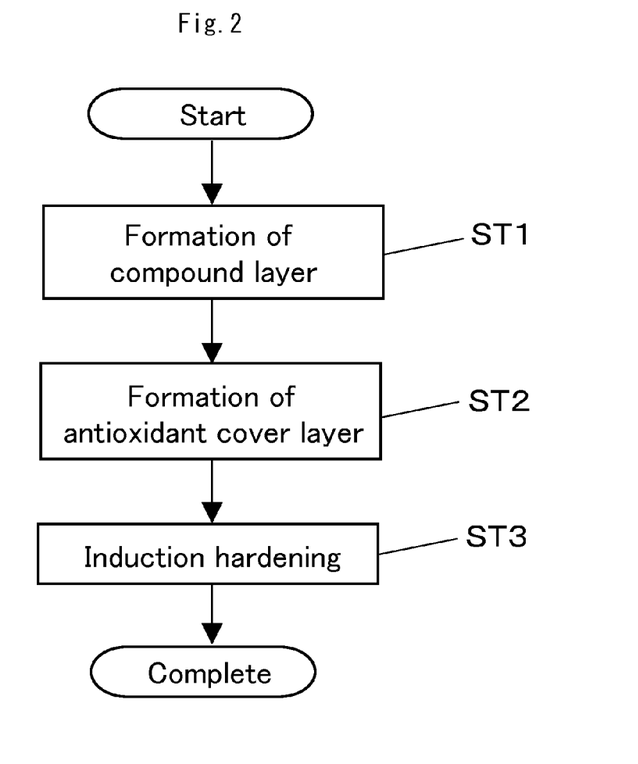
FIG. 2 is a flow chart showing the first embodiment of the production method of the iron and steel material shown in FIG. 1.

FIG. 2 is a flow chart showing the first embodiment of the production method of the iron and steel material 10 shown in FIG. 1.

First, in step ST1, a compound layer 12 is formed on the surface of a base material 11 by ISONITE™ treatment, for example.

Then, in step ST2, an antioxidant cover layer 13 is formed on the surface of the compound layer 12.

In step ST3, the base material 11 containing the compound layer 12 and the antioxidant cover layer 13 undergoes induction hardening.

Figure 3:
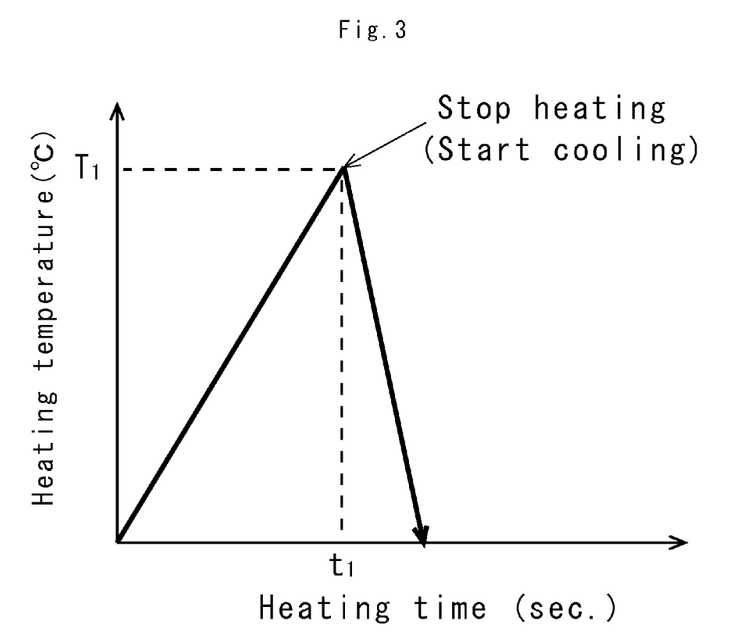
FIG. 3 illustrates the heating conditions of induction hardening.

FIG. 3 illustrates the heating conditions of induction hardening, with the horizontal axis of the figure representing heating time (sec.) and the vertical axis representing heating temperature (° C.). As shown in FIG. 3, induction heating is performed in a short period of time to reach a predetermined heating temperature (T1) in the predetermined heating time t1, and rapid cooling is performed immediately once the predetermined heating temperature T1 is reached. In the case shown in the figure, heating rate (° C./sec.) remains constant.

It is desirable that the heating temperature T1 fall within the range from 760° C. to 880° C. (760° C.≤T1≤880° C.), and that heating time t1 fall within the range from 0.6 sec. to 2 sec. (0.6 sec.≤t1≤2 sec.) As far as the heating time t1 falls within the 0.6 sec. to 2 sec. range, heating rate need not be constant.

The hardness of the surface layer part of the base material 11 containing the compound layer 12 is thus enhanced by quenching. Furthermore, since the compound layer 12 is covered with the antioxidant cover layer 13, oxidation of the surface of the compound layer 12 is suppressed by the antioxidant cover layer 13. Consequently, oxidized layer is not formed.

Figure 4:
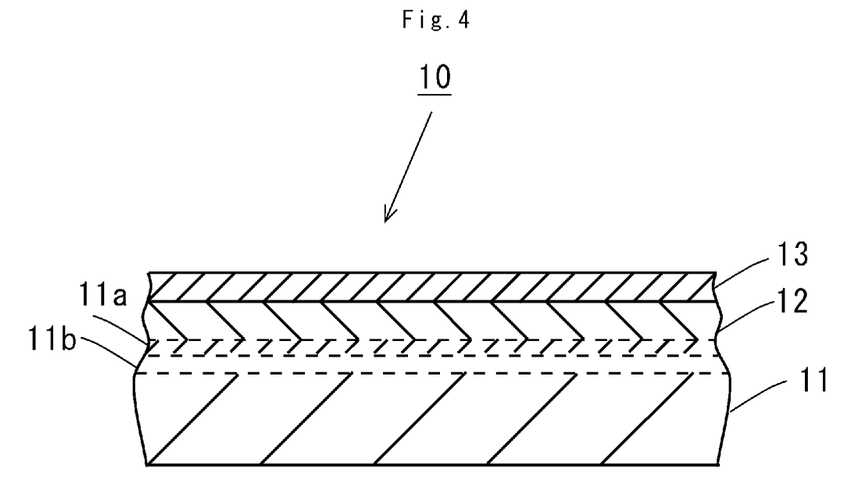
FIG. 4 is a schematic diagram illustrating the state of the iron and steel material shown in FIG. 1 after induction heating is applied.

FIG. 4 is a schematic diagram illustrating the state of the iron and steel material 10 shown in FIG. 1 after induction heating is performed. The surface layer part in the base material 11 contacting the compound layer 12 is changed into N-concentration layer 11a through induction hardening. The N-concentration layer 11a, which is relatively soft, increases the adhesion of the compound layer 12 to the base material 11.

Since nitrogen atoms are diffused from the compound layer 12, an N-diffusion layer 11b is formed immediately below the N-concentration layer 11a.

The iron and steel material 10 having quenched surface layer part can thus be formed.

If induction hardening in step ST3 is performed within the range 760° C.≤T1≤880° C. and 0.6 sec.≤t1≤2 sec., both the compound layer 12 and N-concentration layer 11a obtained after quenching are good, and the hardness of the hardened layer formed on the surface of the base material 11 is also high.

If heating time t1 and the heating temperature T1 do not fall within the above range, the hardness of the hardened layer formed on the surface of the base material 11 decreases, and the surface of the compound layer 12 and the N-concentration layer 11a degrade, which is not preferable. When the heating temperature T1 is too high, or the heating time t1 is too long even if the heating temperature T1 is very low, not falling within the permissible range, overheating occurs, thus causing the surface of the antioxidant cover layer 13 to become porous.

If the surface layer part of the base material 11 contacting the compound layer 12 changes into N-concentration layer 11a, the hardness of the surface layer part of the base material 11 is enhanced as a result of formation of the N-concentration layer 11a.

In the iron and steel material 10 having quenched surface layer part according to the present invention, since the surface of the compound layer 12 is covered with the antioxidant cover layer 13, formation of an oxidized layer on the surface of the compound layer 12 due to quenching is suppressed. Consequently, thinning of the remaining compound layer 12 or loss of a part of it is prevented. The compound layer 12 can thus be maintained relatively thick, and mechanical strength, sliding resistance, and abrasion resistance inherent in the compound layer 12 remain intact. Note that the antioxidant cover layer 13 can be removed or maintained as it is after induction hardening is completed. Selection can be made as required.

Since buckling never occurs to the iron and steel material 10 according to the present invention, it is applicable to parts used under high load such as various gears, CVT parts, and pinion shafts. For example, it can be used for driving parts ranging from automobile engines to tires, namely powertrain components.

Example 1

The example of the iron and steel material 10 having quenched surface layer part according to the present invention (hereinafter referred to simply as iron and steel material) will hereinafter be described in detail.

As the base material 11, chromium-molybdenum steel (SCM440) having diameter of 6.5 mm and length of 40 mm was used. After its surface was degreased, salt-bath nitrocarburizing (ISONITE™ treatment Nihon Parkerizing Co., Ltd.) was performed in a fused salt bath at 570° C. for 2 hours for oil cooling to form an iron-nitride compound layer 12 having a thickness of approximately 11 μm on the surface of the base material 11.

The base material 11, on which the iron-nitride layer 12 had been formed, was then dip-coated with titanium oxide neutral water dispersion sol (PALTITAN 5603: Anatase+amorphous sol, Nihon Parkerizing Co., Ltd.) having a concentration of 4%, and after excessive liquid was removed, dried at 180° C. Using a fluorescent X-ray analyzer, the attachment of Ti was measured to be 150 mg/m$^2$.

The base material 11, on which the iron-nitride compound layer 12 and then the titanium-oxide antioxidant cover layer 13 had been formed, was further heated using induction hardening apparatus, and immediately after the temperature reached 780° C. in 0.6 seconds from the start of heating, the heating was stopped for cooling to produce the iron and steel material 10 in example 1.

Example 2

The iron and steel material 10 in example 2 was produced under the same induction hardening conditions as those of example 1, except that heating was stopped immediately after reaching 800° C. in 0.6 seconds from the start of heating to start quenching.

Example 3

The iron and steel material 10 in example 3 was produced under the same induction hardening conditions as those of example 1, except that heating was stopped immediately after reaching 780° C. in one second from the start of heating to start quenching.

Example 4

The iron and steel material 10 in example 4 was produced under the same induction hardening conditions as those of example 1, except that heating was stopped immediately after reaching 800° C. in one second from the start of heating to start quenching.

Comparative example 1

The iron and steel material in comparative example 1 was produced under the same induction hardening conditions as those of example 1 of the present invention, except that heating was stopped immediately after reaching 760° C. in 3 seconds from the start of heating to start quenching.

Comparative Example 2

The iron and steel material in comparative example 2 was produced under the same induction hardening conditions as those of the example 1 of the present invention, except that heating was stopped immediately after reaching 880° C. in 3 seconds from the start of heating to start quenching.

In the examples of the present invention and comparative examples with induction hardening conditions varied, the surface of the iron and steel material 10 was observed under a scanning electron microscope (SEM), and the thickness of the antioxidant cover layer 13, compound layer 12, and N-concentration layer 11a formed on the surface of the base material 11 was measured from the surface side on the cross-sectional area.

Figure 5:
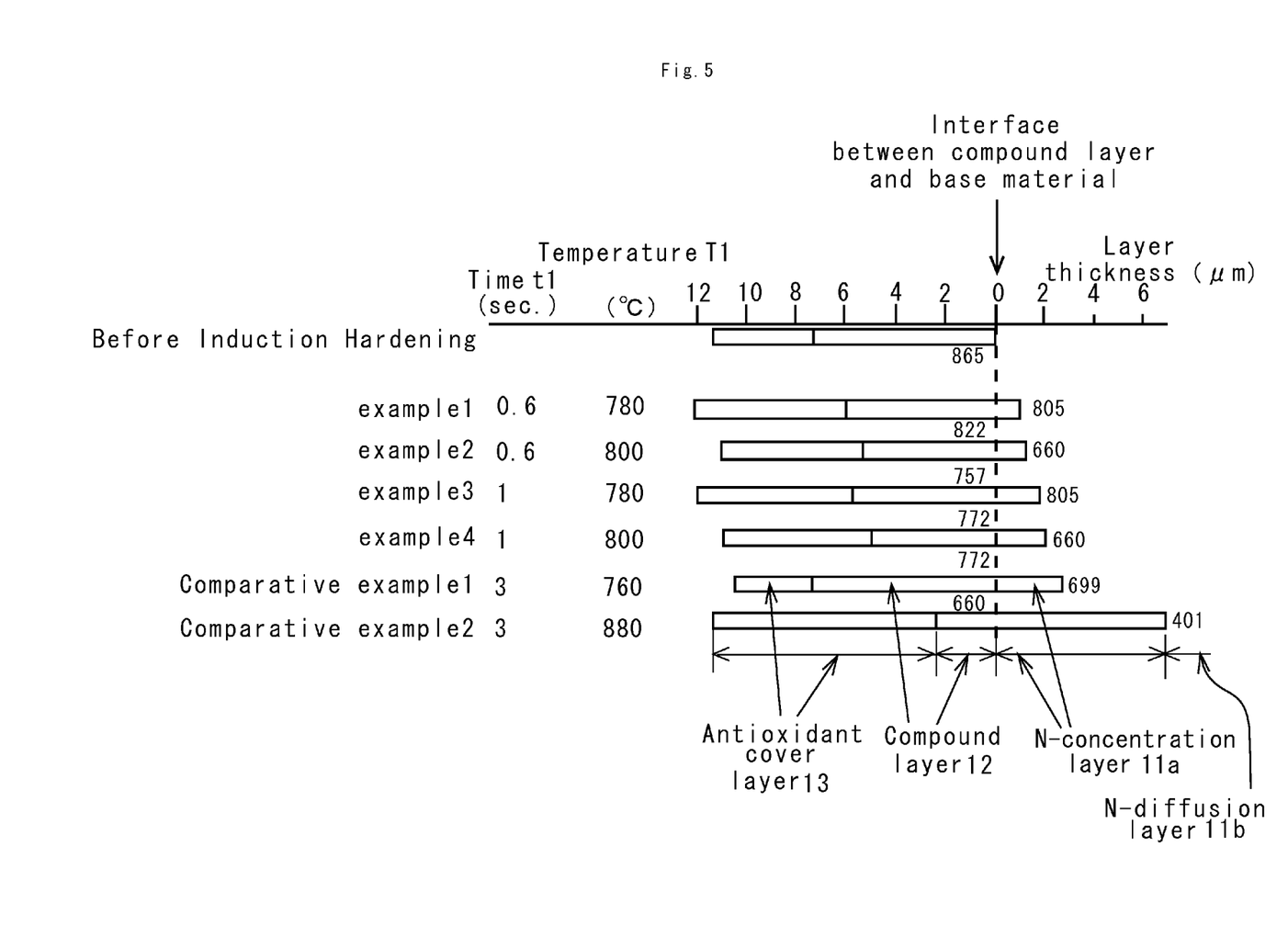
FIG. 5 is a table listing the thickness of each layer of iron and steel materials produced in various induction hardening durations and at temperatures in the present invention's examples and comparative examples.

FIG. 5 is a table exhibiting the thickness of each layer of the iron and steel material produced at various induction hardening durations and temperatures in the examples and comparative examples. As shown in FIG. 5, the higher the induction hardening temperature is, the thinner the thickness of the compound layer 12 is and the thicker the thickness of the N-concentration layer 11a is. It is apparent that at the induction hardening temperature T of 760° C. and 780° C., N-concentration layer 11a is formed favorably, with the compound layer 12 maintained thick.

The numeric values in FIG. 5 represent Vickers hardness of the compound layer 12 and the N-concentration layer 11a. Vickers hardness was measured using a micro hardness tester with load of 0.49N applied for 10 seconds. When induction hardening time was set to 0.6 seconds and 1 second, Vickers hardness of the compound layer 12 and the N-concentration layer 11a tended to decrease with the increase of induction hardening temperature. Meanwhile, as Vickers hardness of the hardened layer formed on the surface of the base material 11, favorable values were obtained when induction hardening temperature was 780° C. and 800° C.

Table 1 provides induction hardening conditions of examples and comparative examples, the assessment of Vickers hardness of each of the compound layer 12, N-concentration layer 11a, and hardened layer of the iron and steel material 10 after quenching, and overall judgment of the iron and steel material 10. As shown in Table 1, with the present invention's examples 1 to 4, Vickers hardness of each of the compound layer 12, the N-concentration layer 11a, and the hardened layer was high, which indicates that quenching was performed well. On the other hand, in comparative example 1, in which induction heating temperature T1 was 760° C. and heating time t1 was 3 seconds, Vickers hardness of the hardened layer was low. In comparative example 2, where induction hardening temperature T1 was 880° C. and heating time t1 was 3 seconds, Vickers hardness of the hardened layer was high, which indicates that induction hardening of the iron and steel material 10 including the compound layer 12 was performed well, but Vickers hardness of the N-concentration layer 11a was low.

As described above, in the present invention's examples 1 to 4, induction hardening of the iron and steel material 10 containing the compound layer 12 was performed well, whereas in comparative examples 1 and 2, Vickers hardness of either the compound layer 12 or the hardened layer was insufficient, which indicates that the iron and steel material 10 in these comparative examples was unacceptable.

TABLE 1

| | Heating Treatment Conditions | | Compound | N-Concentration | Hardening | Overall |
|---|---|---|---|---|---|---|
| | Temparature T1 (° C.) | Time t1 (sec) | Layer | Layer | Layer | Judgement |
| Example 1 | 780 | 0.6 | Excellent | Excellent | Excellent | Excellent |
| Example 2 | 800 | 0.6 | Good | Good | Excellent | Good |
| Example 3 | 780 | 1 | Excellent | Excellent | Excellent | Excellent |
| Example 4 | 800 | 1 | Good | Good | Excellent | Good |
| Comparative example 1 | 760 | 3 | Good | Good | NG | NG |
| Comparative example 2 | 880 | 3 | NG | NG | Good | NG |

FIGS. 6 to 10 present test results of the iron and steel material 10 that has undergone induction hardening according to the present invention and those of conventional iron and steel materials.

Figure 6:
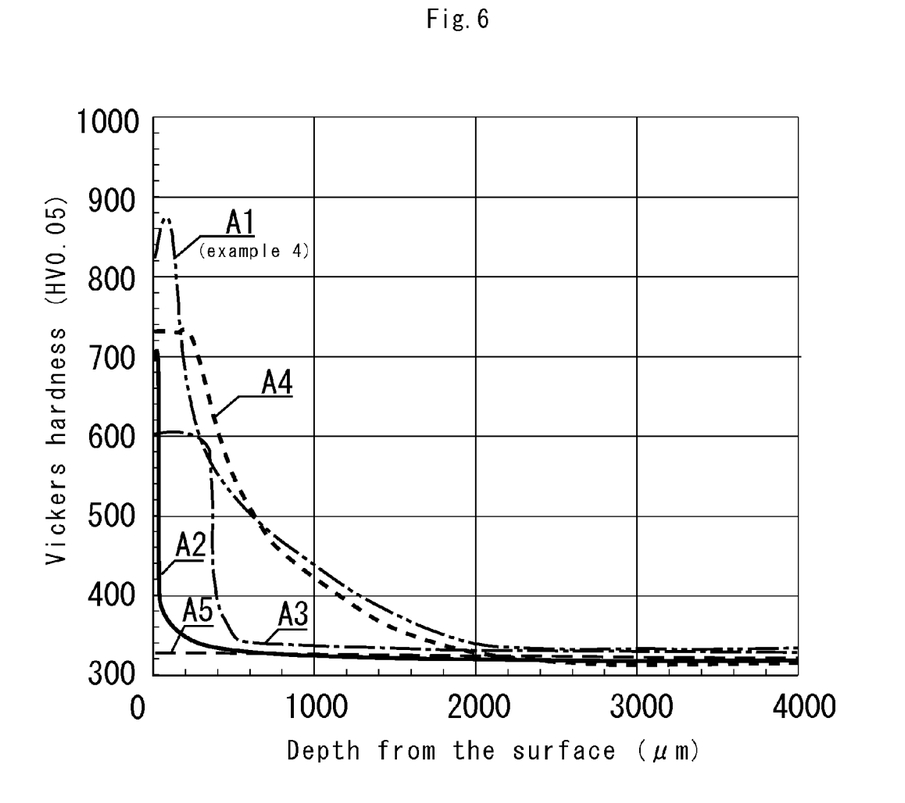
FIG. 6 is a graph showing the hardness distribution on the cross-sectional area of the iron and steel material applied induction hardening to example 4 and to various iron and steel materials.

FIG. 6 is a graph showing the hardness distribution of the cross-sectional area of the iron and steel material 10 in the example 4 and of various iron and steel materials. The horizontal axis of FIG. 6 represents the depth (μm) from the surface, and the vertical axis represents Vickers hardness (HV0.05). In this case, tests were conducted using a small hardness meter as the micro hardness tester, with load of 0.49N applied for 10 seconds to measure Vickers hardness.

In FIG. 6, reference sign A1 represents the iron and steel material 10 which induction hardening was applied to the example 4, A2 represents the material produced by forming a compound layer 12 only on the base material 11 through ISONITE™ treatment, with no induction hardening performed, A3 represents the material which the induction hardening (hereinafter referred to as IH treatment) was applied to the base material 11, A4 represents the material (SCM415, Effective depth: 0.5 mm) which carburizing and quenching (hereinafter referred to as CQ treatment) was applied to the base material 11, and A5 represents the material which thermal refining (hereinafter referred to as QT treatment) was applied to the base material 11, respectively.

As shown in FIG. 6, the iron and steel material 10 (reference sign A1) in the example 4 has Vickers hardness HV of approximately 870 near the surface, which is higher than that of the material shown by reference sign A2. The iron and steel material 10 in the example 4 with deep hardened layer has approximately the same hardness characteristics as the material that has undergone CQ treatment shown by reference sign A4.

Figure 7:
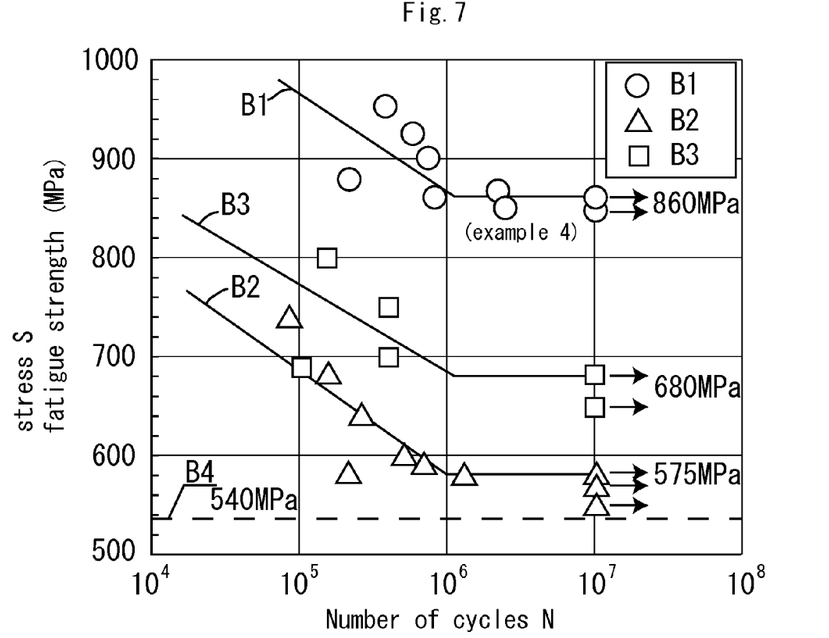
FIG. 7 is a graph showing S-N diagram of the iron and steel material applied induction hardening to example 4 and to various iron and steel materials.

FIG. 7 is a graph showing S-N diagram of the iron and steel material 10 of the example 4 and of various iron and steel materials. The S-N diagram, which is also called Wohler curve, represents the relation between the number of cycles (N) required to cause rupture and stress (S). The horizontal axis of FIG. 7 represents the number of cycles, whereas the vertical axis represents fatigue strength (MPa). The tests were conducted using an Ono-type rotary bending fatigue strength testing machine, with flat and smooth test pieces made of SCM440 and having diameter of 8 mm tested in room temperature atmosphere and at the closing cycle of $1 \times 10^7$.

In FIG. 7, reference sign B1 represents the iron and steel material 10 in the example 4, B2 represents the material produced by forming compound layer 12 only on the base material 11 through ISONITE™ treatment with no induction hardening performed, B3 represents the base material 11 that has undergone IH treatment, and B4 represents the base material 11 that has undergone QT treatment, respectively.

As shown in FIG. 7, the iron and steel material 10 (reference sign B1) in example 4 has fatigue strength of 860 MPa, which is 1.59 times that of the iron and steel material shown by reference sign B2 (fatigue strength: 575 MPa), and 1.26 times that of the iron and steel material shown by reference sign B3 (fatigue strength: 680 MPa).

Figure 8:
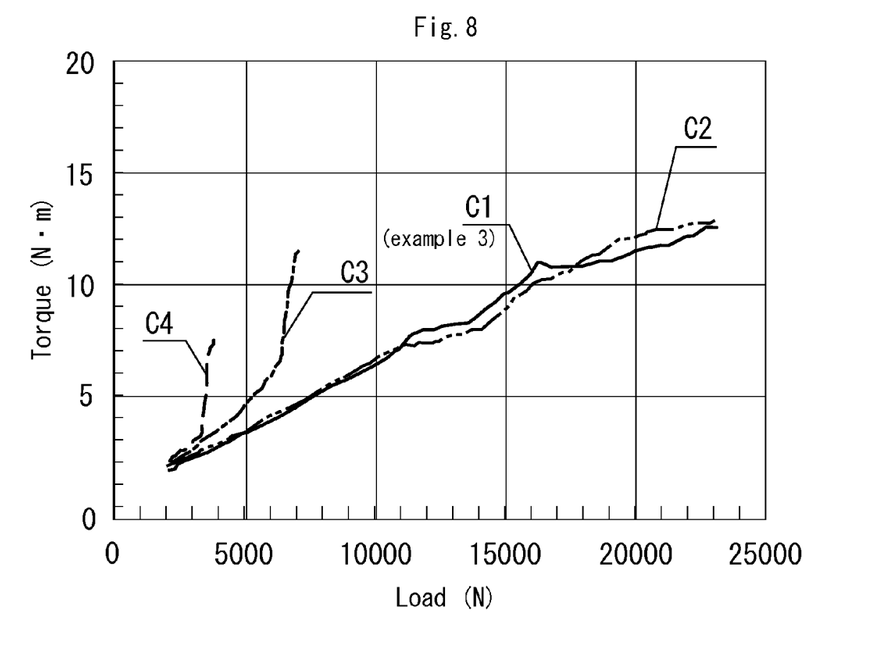
FIG. 8 is a graph showing the result of Fabry wear test of the iron and steel material applied induction hardening to example 3 and to various iron and steel materials.

FIG. 8 is a graph showing the results of Fabry wear test of the iron and steel material 10 in the example 3 and of various other iron and steel materials. The horizontal axis of FIG. 8 represents load (N), and the vertical axis represents torque (N·m). The test method adopted in this case was as follows: Using a Fabry wear tester, a pin made of SCM440 (CQ; SCM415) and having diameter of 6.5 mm and a V block made of SCM415 (CQ) were rotated at the circumferential speed of 0.1 m/sec., with the load gradually increased from the initial load of 200 kg at the rate of 25 kg/sec., while engine oil (10W-30) was used as lubricating oil, to measure the torque.

In FIG. 8, reference sign C1 represents the iron and steel material 10 in the example 3, reference sign C2 represents the material produced by forming a compound layer 12 only on the base material 11 through ISONITE™ treatment, with no induction hardening performed, C3 represents the base material 11 that has undergone IH treatment, and C4 represents the base material 11 that has undergone CQ treatment, respectively. As shown in FIG. 8, seizure did not occur to the iron and steel material 10 in the example 3 (reference sign C1) even if load of 2300 kg was applied as in the case of the iron and steel material shown by reference sign C2. Meanwhile, seizure occurred to the iron and steel material shown by reference sign C3 and that shown by reference sign C4 when load of approximately 700 kg and 350 kg was applied respectively.

Figure 9:
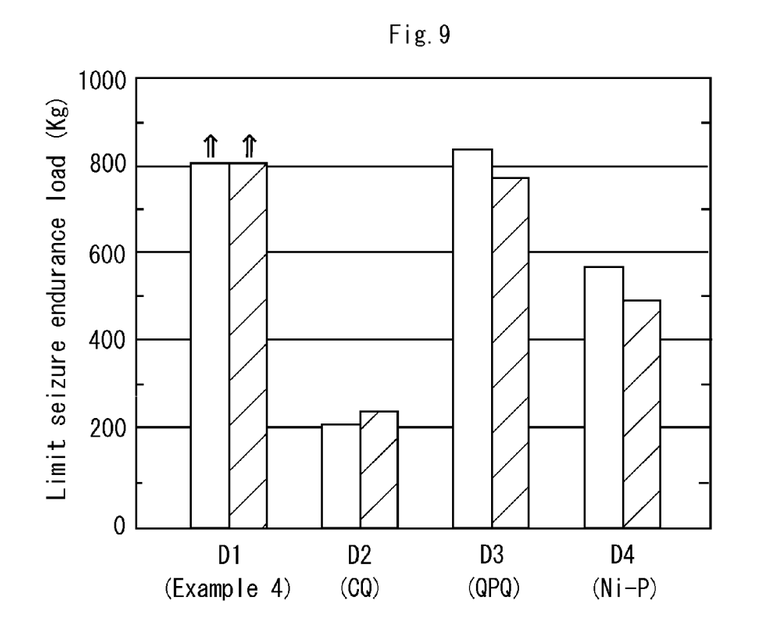
FIG. 9 is a graph showing the result of Falex friction/abrasion test of the iron and steel material applied induction hardening to example 4 and to various iron and steel materials.

FIG. 9 is a graph showing the result of Falex wear test of the iron and steel material 10 that has undergone induction hardening in example 4 and of various iron and steel materials. The vertical axis in FIG. 9 represents the limit seizure endurance load (kg). The test method adopted in this case was as follows: Using a Falex wear tester, a pin made of SCM440 (CQ; SCr420) and having diameter of 10 mm and a V block made of SCr420 (CQ treatment+manganese phosphate treatment) were rotated at the circumferential speed of 0.4 m/sec., with the step load applied at the rate of 50 kg/min., while CVT oil (NS2) was used as lubricating oil, to measure the limit seizure endurance load.

In FIG. 9, reference sign D1 represents the iron and steel material 10 in the example 4, D2 represents the base material 11 that has undergone CQ treatment, and D3 represents the base material 11 that has undergone QPQ treatment. The QPQ treatment is a procedure in which the base material 11 is subjected to nitrocarburizing treatment and then to combination treatment of oxidizing treatment and grinding. For example, after having undergone nitrocarburizing treatment, the base material is immersed in fused salt containing alkali metal hydroxides and alkali metal nitrates as major components for oxidation treatment. Its surface is then ground with abrasive blasting, etc., and it is immersed in fused salt again to generate an oxide film on the nitride layer. Since smoothing is performed, with the nitrided compound layer 12 maintained on the base material 11, and the outermost layer is oxidized, sliding characteristics are enhanced, which is the feature of QPQ treatment. reference sign D4 represents the base material 11 that has undergone electroless nickel plating (Ni-P treatment).

As shown in FIG. 9, with the iron and steel material 10 in the example 4 (reference sign D1), seizure did not occur even under the load of 800 kg in combination with the V block that has undergone CQ treatment and manganese phosphate treatment, whereas seizure occurred to all of the iron and steel materials represented by reference signs D2, D3, and D4. From the above, the iron and steel material 10 in the example 4 was found to have improved sliding characteristics, compared with the base material 11 that has undergone QPQ treatment.

Figure 10:
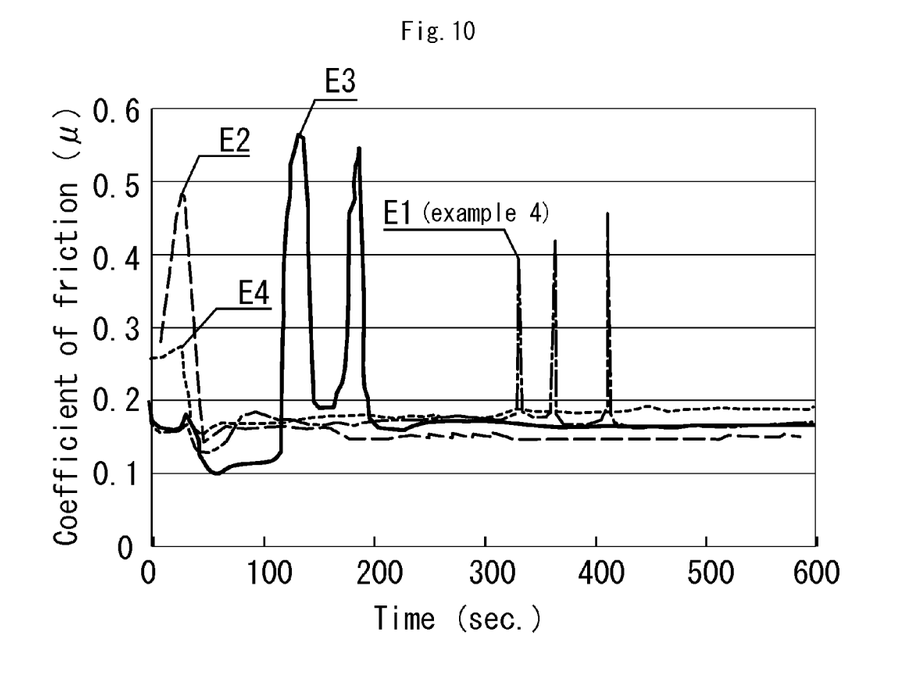
FIG. 10 is a graph showing the result of SRV test of the iron and steel material applied induction hardening to example 4 and to various other iron and steel materials.

FIG. 10 is a graph showing the result of SRV test of the iron and steel material 10 in the example 4 and of various other iron and steel materials. The horizontal axis in FIG. 10 represents time (sec.), and the vertical axis in FIG. 10 represents coefficient of friction (µ). The test method adopted in this case was as follows: Using an SRV tester, a pin made of SCM440 (CQ: SCM420) and a disc made of SCM420 (CQ) were moved by 2 mm at 30 Hz, and the friction at that time was measured in oil of the temperature of 110° C.

In FIG. 10, reference sign E1 represent the iron and steel material 10 in the example 4, reference sign E2 represents the base material 11 that has undergone CQ treatment, reference sign E3 represent the base material 11 that has undergone CQ treatment and manganese phosphate treatment, and reference sign E4 represents the base material 11 that has undergone CQ treatment, manganese phosphate treatment, and solid lubrication treatment, respectively. As shown in FIG. 10, with the iron and steel material 10 in the example 4 shown by reference sign E1, seizure occurred after 300 seconds, which was the best seizure resistance exhibited. With the base material 11 that has undergone CQ treatment shown by reference sign E2 and the base material 11 that has undergone CQ treatment, manganese phosphate treatment, and solid lubrication treatment shown by reference sign E4, seizure occurred just in several dozen seconds, and even with the material that has undergone CQ treatment and manganese phosphate treatment shown by reference sign E3, seizure occurred in 100 to 200 seconds.

From the above, it was found that the iron and steel material 10 in the example 4 shown by reference sign E1 is applicable to various parts used under heavy load such as gears, CVT parts, and pinion shafts because buckling never occurred in the test conducted under high contact pressure.

As described above, the present invention can provide an excellent iron and steel material 10, in which the compound layer 12 formed on a base material 11 is prevented from being oxidized due to induction hardening thanks to an antioxidant cover layer 13, a method for producing the iron and steel material, and components having undergone induction hardening.

REFERENCE SIGNS LIST

10: Iron and steel material having quenched surface layer part
11: Base material (iron and steel material)
11a: N-concentration layer
11b: N-diffusion layer
12: Compound layer
13: Antioxidant cover layer

What is claimed is:

1. An induction hardening method for an iron and steel material, comprising:

preparing a base material having a compound layer formed thereon, the base material being made of iron and steel, the compound layer being a nitride layer containing at least one element selected from the group consisting of Fe, Ti, Zr, Mo, W, Cr, B and Si;

forming an antioxidant cover layer to cover the compound layer on the base material, the antioxidant cover layer being a metal oxide containing at least one metal element selected from the group consisting of Ti, Zr, Hf, V, Nb, Ta, Cr, W, Mo and Al, and applying induction hardening to the base material having the compound layer and the antioxidant cover layer formed thereon, wherein in the step of applying induction hardening, heating is performed to reach a heating temperature (T1) in a heating time (t1), and cooling is performed immediately after the heating temperature reaches T1, the heating temperature T1 being $760° C. \leq T1 \leq 880° C.$, and the heating time t1 being $0.6 \text{ sec.} \leq t1 \leq 2 \text{ sec.}$ 2. The induction hardening method for an iron and steel material according to claim 1, wherein the antioxidant cover layer is formed so that metal in the amount of to 220 $mg/m^2$ is attached on the base material having the compound layer formed thereon.

* * * * *